United States Patent [19]

McMaster

[11] Patent Number: 4,505,671
[45] Date of Patent: Mar. 19, 1985

[54] GLASS SHEET ROLLER CONVEYOR FURNACE INCLUDING GAS JET PUMP HEATING

[75] Inventor: Harold A. McMaster, Woodville, Ohio

[73] Assignee: Glasstech, Inc., Perrysburg, Ohio

[21] Appl. No.: 332,504

[22] Filed: Dec. 22, 1981

Related U.S. Application Data

[63] Continuation-in-part of Ser. No. 235,269, Feb. 17, 1981, abandoned.

[51] Int. Cl.³ ............. F27B 9/00; F27B 9/06; C03B 13/00; F27D 11/00
[52] U.S. Cl. .................................. 432/144; 65/95; 65/350; 219/388; 432/148
[58] Field of Search ............... 432/144, 145, 148; 219/388; 65/95, 350; 239/433

[56] References Cited

U.S. PATENT DOCUMENTS

| | | | |
|---|---|---|---|
| 1,448,162 | 3/1923 | Sneddon | 432/145 |
| 3,326,654 | 6/1967 | Plomat | 65/350 |
| 3,402,038 | 9/1968 | Hordis | 65/350 |
| 3,488,178 | 1/1970 | Welker et al. | 65/114 |
| 3,778,244 | 12/1973 | Nedelec et al. | 65/106 |
| 3,806,312 | 4/1974 | McMaster et al. | 432/121 |
| 3,907,132 | 9/1975 | McMaster et al. | 214/18 R |
| 3,934,970 | 1/1976 | McMaster et al. | 432/121 |
| 3,947,242 | 3/1976 | McMaster et al. | 432/122 |
| 3,994,711 | 11/1976 | McMaster | 65/163 |
| 4,059,426 | 11/1977 | Starr | 65/25 |
| 4,059,427 | 11/1977 | Starr et al. | 65/25 A |
| 4,195,780 | 4/1980 | Inglis | 417/187 |
| 4,202,681 | 5/1980 | McMaster et al. | 65/104 |
| 4,204,854 | 5/1980 | McMaster et al. | 65/106 |
| 4,222,763 | 9/1980 | McMaster | 65/287 |
| 4,282,026 | 8/1981 | McMaster et al. | 65/273 |

Primary Examiner—John J. Camby
Attorney, Agent, or Firm—Brooks & Kushman

[57] ABSTRACT

A roller conveyor furnace (12) is disclosed as including at least one gas jet pump (24) for providing forced convection heating of glass sheets during conveyance on rolls (22) of the furnace conveyor (20). A source (26) of compressed gas located externally of the furnace is communicated with the gas jet pump to supply a primary gas flow thereto and induce an amplified extent of a secondary gas flow in order to provide a combined flow of heated gas that produces the forced convection heating. Upper and lower arrays (70,72) of the gas jet pumps are disclosed as being usable separately or in cooperation with each other in one embodiment to maintain temperature uniformity and glass sheet planarity. Each array includes an associated conduit support (74,76) that mounts the gas jet pumps thereof in a spaced relationship transverse to the direction of conveyance either above or below the conveyor rolls. In another embodiment, the compressed gas supplied to the gas jet pumps (24) is heated to provide the primary source for heating the furnace. One gas jet pump utilized comprises a simple jet opening, while another pump comprises a restricted opening and a contoured surface along which the primary gas flow is guided, and a further pump includes a deflector that initially guides the primary gas flow from a restricted opening along the contoured surface.

14 Claims, 8 Drawing Figures

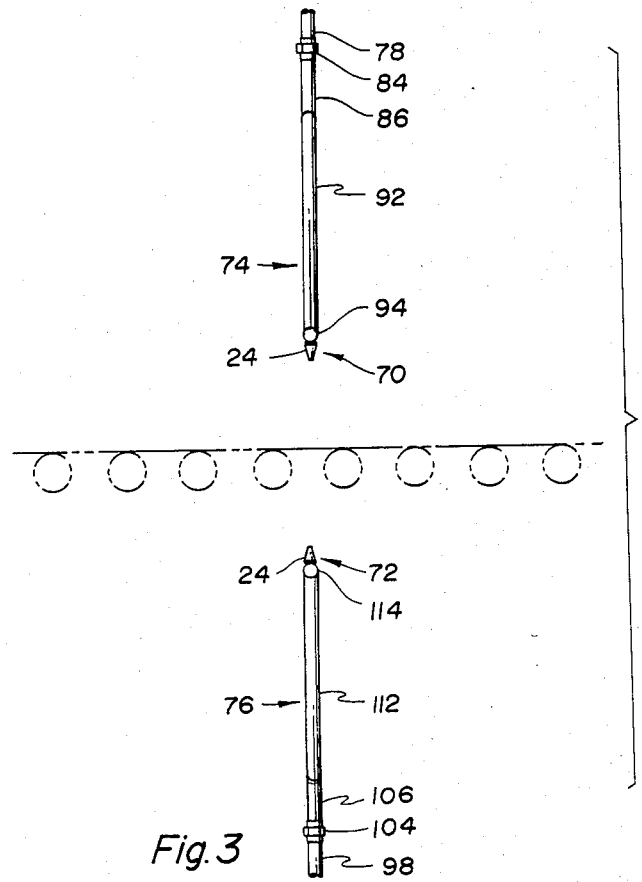
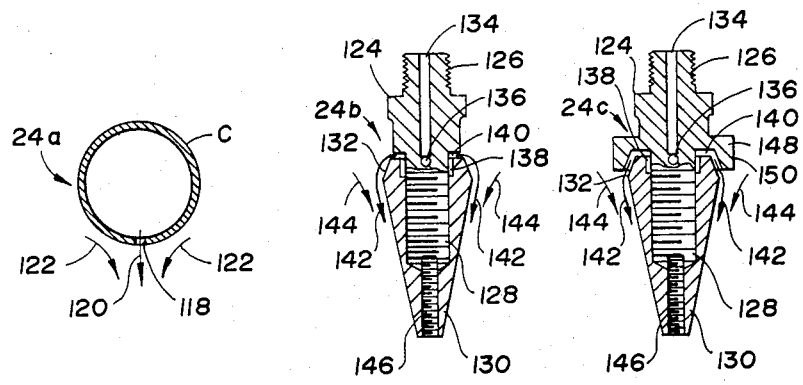
Fig. 3  Fig. 4  Fig. 5  Fig. 6

4,505,671

GLASS SHEET ROLLER CONVEYOR FURNACE INCLUDING GAS JET PUMP HEATING

CROSS REFERENCE TO RELATED APPLICATIONS

This application is a continuation-in-part of application Ser. No. 235,269 which was filed on Feb. 17, 1981, now abandoned.

TECHNICAL FIELD

This invention relates to furnaces for heating glass sheets on a roller conveyor in preparation for a processing operation such as tempering, bending, bending and tempering, or filming, etc.

BACKGROUND ART

U.S. Pat. Nos. 3,806,312; 3,934,970; 3,947,242; and 3,994,711 disclose furnaces including roller conveyors for heating glass sheets while conveyed in a generally horizontal orientation through an associated heating chamber. Convection between both the top and bottom surfaces of the conveyed glass sheets and the gas within the heating chamber performs a certain extent of the heating. Conduction between heated rolls of the conveyor and the bottom surface of each conveyed glass sheet also provides some of the heating. In addition, the preferred construction of these furnaces utilizes electric resistance elements both above and below the conveyor rolls such that both the top and bottom surfaces are also heated by radiation. Of course, the rolls shield the bottom surface of each glass sheet to some degree from the resistance elements located below the conveyor and thereby decrease the radiant energy that is transferred to the glass.

It is important to maintain glass sheets generally planar during heating on roller conveyors regardless of whether the final product is to be flat glass for architectural use or bent glass such as used with vehicles. Due to conduction of heat from the rolls, the bottom surface of the glass sheet heats more rapidly causing the glass sheet to be convex at its bottom surface and causing the central area which remains in contact with the rolls to overheat which warps the glass sheet and also results in roll print at the central area. Flat glass is usually tempered or is first coated with a metal film and then tempered by rapid cooling of the heated glass sheet which cannot deviate too much from a uniform temperature if the final product is to be flat. Depending upon the type of bending equipment utilized, it can be difficult to provide an accurate control of the shape of bent glass if the heated glass sheet deviates from a uniform temperature by too great an extent.

Heating of glass sheets to a desired temperature for processing is most preferably performed as rapidly as possible to keep the furnace short to lower heat losses and so as to provide heating with as little distortion as can be achieved.

U.S. Pat. Nos. 3,778,244; 4,202,681; and 4,222,763 disclose bending stations including gas jet pumps utilized in association with roller conveyor type furnaces within which glass sheets are heated. These gas jet pumps are supplied pressurized gas through a nozzle opening so as to effect a primary gas flow which induces a secondary gas flow in order to support a heated glass sheet in preparation for bending or to provide the bending against a curved surface located above the roller conveyor.

U.S. Pat. Nos. 4,059,426 and 4,059,427 disclose glass sheet heating furnaces of the gas support type wherein gas jet pumps pressurize a plenum chamber below a support bed having passages through which the pressurized gas escapes to support a glass sheet above the bed for conveyance therealong and heating within the furnace heating chamber. Pressurized gas fed to the gas jet pumps from outside of the heating chamber is throttled to provide a primary gas flow along a curved surface so as to thereby induce a secondary gas flow of a greatly amplified extent for pressurizing the chamber that feeds the gas through the passages of the support bed on which the glass sheets are conveyed. Also, the U.S. Pat. No. 4,059,426 additionally discloses such gas jet pumps positioned above the gas support bed so as to direct heated gas flow downwardly against the top surfaces of glass sheets conveyed on the gas support bed. Electrical resistance heating of the compressed gas supplied to such jet pumps provides the energy input to maintain the heated condition of the gas within this furnace.

U.S. Pat. No. 4,204,854 discloses gas jet pumps utilized with a glass sheet heating furnace of the roller conveyor type so as to blow heated glass sheets upwardly off of the conveyor rolls against a holder positioned above the conveyor in preparation for depositing of the glass sheet on a mold for bending.

U.S. Pat. No. 4,282,026 discloses a glass sheet bending system in which a heated glass sheet is lifted upwardly from a horizontal conveyor and supported by a differential gas pressure against a downwardly facing surface of a holder in preparation for bending. Termination of the differential gas pressure releases the heated glass sheet so as to drop downwardly onto a mold of a curved shape for bending. An actuator moves the mold to a quench unit in a time to control the extent of bending before tempering of the glass sheet.

DISCLOSURE OF INVENTION

An object of the present invention is to provide forced convection heating of glass sheets during conveyance thereof on a furnace roller conveyor to provide a uniform temperature and a generally planar condition of the conveyed sheets during heating.

Another object of the invention is to provide forced convection heating of glass sheets during conveyance thereof on a furnace roller conveyor in order to provide rapid heating thereof to a desired temperature.

In carrying out the above objects as well as other objects, a glass sheet heating furnace constructed in accordance with the present invention includes a housing defining a heating chamber and also includes a roller conveyor having horizontally extending rolls for conveying glass sheets horizontally through the heating chamber for heating of the glass sheets. At least one gas jet pump of the furnace is located within the heating chamber, and a source of compressed gas located externally of the heating chamber is communicated with the gas jet pump to supply a primary gas flow thereto in order to induce a secondary gas flow and provide a combined flow of heated gas. The gas jet pump is oriented such that the combined flow of heated gas therefrom is directed toward the conveyor to provide forced convection heating of conveyed glass sheets during conveyance thereof on the rolls of the conveyor with the bottom glass sheet surfaces in continuous engagement with the conveyor rolls.

One embodiment of the gas jet pump comprises a simple jet opening that is fed compressed gas from the external source to provide a jet of primary gas flow that induces the secondary gas flow to provide the combined flow of heated gas that produces the forced convection heating. Another embodiment of the gas jet pump includes a restricted opening that is fed compressed gas from the external source and also includes a contoured surface along which the primary gas flow from the opening is guided to induce the secondary gas flow and thereby provide the combined flow of heated gas that produces the forced convection heating. Such a gas jet pump provides a much greater extent of secondary gas flow than a simple jet opening and thus provides a greater extent of forced convection heating of glass sheets during conveyance thereof on the rolls of the conveyor. A further embodiment of the gas jet pump also includes a restricted opening as well as a contoured surface along which the primary gas flow from the opening is guided and additionally includes a deflector that initially guides the primary gas flow along the contoured surface.

Best results are achieved with an array of the gas jet pumps spaced from each other transversely to the direction of conveyance so as to uniformly heat each conveyed glass sheet over its entire width. Both upper and lower arrays of the gas jet pumps are provided in the furnace embodiments disclosed. The upper array of gas jet pumps is located above the roller conveyor to provide forced convection heating of top surfaces of conveyed glass sheets by downward gas flow. The lower array of gas jet pumps is located below the roller conveyor to provide forced convection heating of the bottom surfaces of conveyed glass sheets by upward gas flow between the rolls. Each array is disclosed as including a conduit support that mounts the gas jet pumps thereof above or below the conveyor within the heating chamber and also supplies the compressed gas to the jet pumps from the external source located outside of the heating chamber. An adjuster of each conduit support is provided to permit vertical adjustment thereof and appropriate positioning of the array of gas jet pumps mounted thereby with respect to the conveyor.

In one preferred furnace embodiment disclosed, the furnace includes electric resistance elements supported on the housing to heat the heating chamber and the forced convection heating provided by the gas jet pump operation is utilized to provide a uniform temperature and maintain planarity of each heated glass sheet in preparation for processing. Mounting of the gas jet pumps on the conduit supports has particular utility with this embodiment since minimal shielding of conveyed glass sheets from radiant heating results.

Either the upper or lower arrays of gas jet pumps can be utilized without the other to provide the forced convection heating that provides a uniform temperature and maintains planarity of glass sheets being heated during conveyance on the furnace roller conveyor. Conventional heating of clear glass will usually involve the use of the upper array of gas jet pumps to provide forced convection heating of the top glass surface to balance the conductive heat supplied to the bottom glass surface by contact with the conveyor rolls. In certain instances, the lower array of gas jet pumps can be utilized without the upper one to provide forced convection heating of the bottom glass surface such as may be necessary when the conductive heating of the bottom surface by the rolls is not as great as the amount of radiant heat shielding of the bottom surface by the rolls. Also, when a glass sheet with a metal film on its top surface is being conveyed, the film results in a greater amount of heating of the top surface and forced convection heating of the bottom surface by the lower array of gas jet pumps is then particularly desirable to provide additional heating of the bottom surface.

In another preferred furnace embodiment disclosed, the furnace includes a plurality of the gas jet pumps spaced along the length of the conveyor within the heating chamber. A heater also provided heats the compressed gas supplied by the external source to the gas jet pumps to provide the primary source for heating the furnace. The primary gas flow of heated gas to each gas jet pump induces a secondary gas flow to provide a combined flow of heated gas that produces the forced convection heating. Upper and lower arrays of the gas jet pumps are mounted by the conduit supports along the length of the conveyor, and insulation surrounds each gas jet pump to prevent radiant heating of conveyed glass sheets by the conduit supports through which the heated gas is supplied to the gas jet pumps.

With both furnace embodiments, adjustment of the mass flow rate of compressed gas fed to the upper and/or lower arrays of gas jet pumps is possible to provide the desired heating of the top and bottom glass surfaces. Such adjustment is also utilized to prevent upward gas flow from lifting the conveyed glass sheets upwardly off the conveyor, i.e. the bottom glass surface is maintained in engagement with the conveyor rolls throughout the heating.

The objects, features, and advantages of the present invention are readily apparent from the following detailed description of the best modes for carrying out the invention when taken in connection with the accompanying drawings.

BRIEF DESCRIPTION OF DRAWINGS

FIG. 3 is a side elevation view taken generally along line 3—3 of FIG. 2 to further illustrate the upper and lower arrays of gas jet pumps;

FIGS. 4, 5, and 6 illustrate different types of gas jet pumps that can be utilized to provide the gas jet pump heating of glass sheets being conveyed on the roller conveyor of the furnace;

BEST MODES FOR CARRYING OUT THE INVENTION

Figure 1:
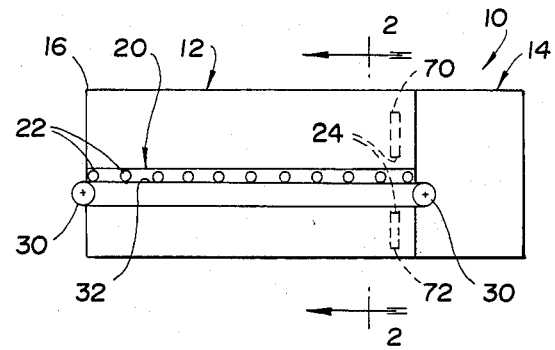
FIG. 1 is a schematic side elevation view of a glass sheet processing system including a roller conveyor furnace that incorporates gas jet pump heating in accordance with the present invention.

Referring to FIG. 1 of the drawings, a glass sheet processing system indicated generally by reference numeral 10 is illustrated schematically. System 10 includes a glass sheet heating furnace 12 constructed in accordance with the present invention and also includes a processing station 14 for processing heated glass sheets to provide bending, tempering, bending and tempering, or filming, etc.

Figure 2:
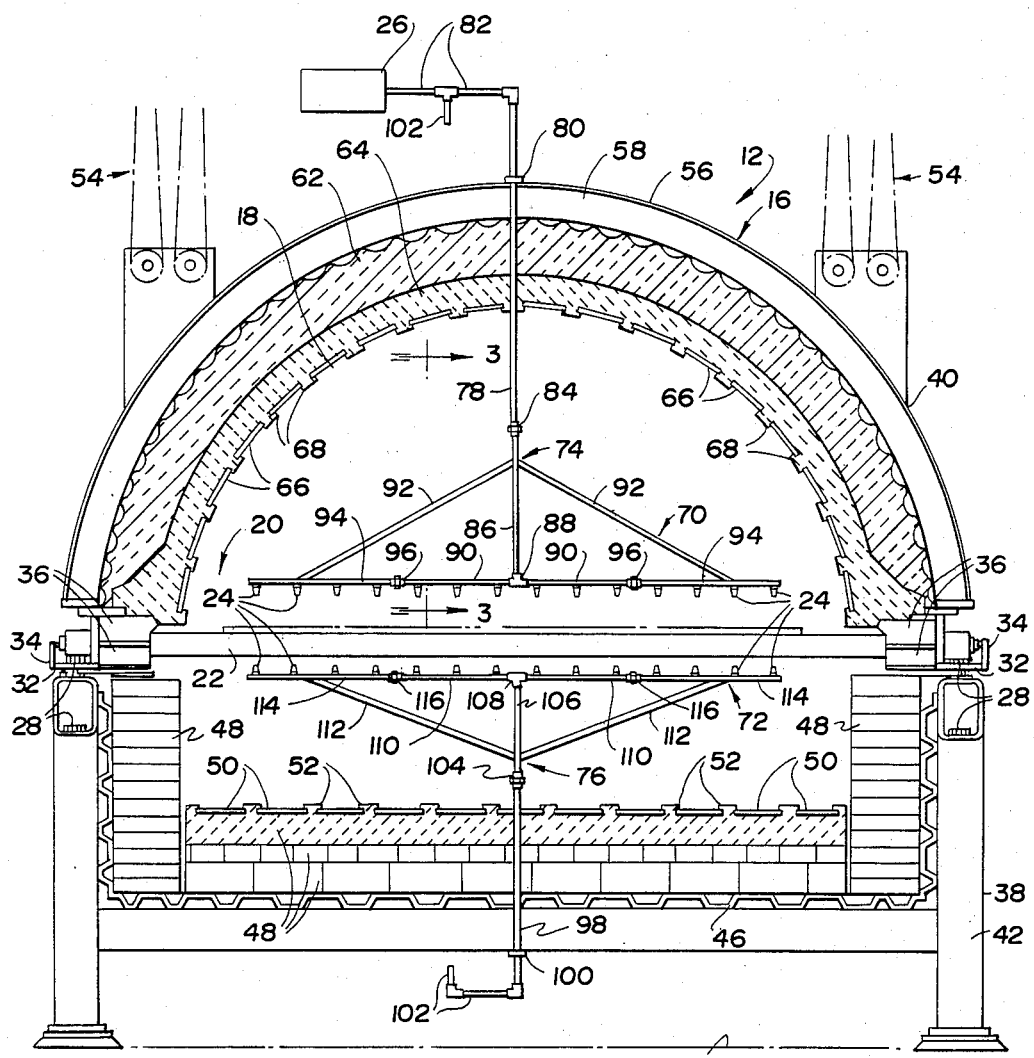
FIG. 2 is a cross-sectional view through the furnace taken generally along line 2—2 of FIG. 1 and illustrates upper and lower arrays of gas jet pumps that provide forced convection heating of glass sheets during conveyance on the roller conveyor of the furnace.

Furnace 12 illustrated in FIGS. 1 and 2 includes a housing 16 defining a heating chamber 18 in which glass sheets are heated. A roller conveyor 20 of the furnace includes horizontally extending rolls 22 for conveying glass sheets G through the heating chamber for heating thereof from room temperature to a desired temperature for processing at the processing station 14. Furnace 12 includes at least one gas jet pump 24 within the heating chamber and, as is more fully hereinafter described, the furnace preferably includes a plurality of the gas jet pumps so as to provide uniform heating. A source 26 of compressed gas is located externally of the heating chamber and communicated with each gas jet pump 24 to supply a primary gas flow thereto in order to induce a secondary gas flow and provide a combined flow of heated gas within the heating chamber. Each gas jet pump 24 is oriented such that the combined flow of heated gas therefrom is directed toward the conveyor 20 to provide forced convection heating of conveyed glass sheets during conveyance thereof on the rolls 22 of the conveyor with the bottom glass sheet surfaces in continuous engagement with the conveyor rolls.

Roller conveyor 20 of the furnace 12 illustrated in FIGS. 1 and 2 is preferably of the type disclosed by U.S. Pat. Nos. 3,806,312; 3,907,132; 3,934,970; and 3,994,711 wherein a pair of continuous drive loops 28 respectively support and frictionally drive the opposite ends of the conveyor rolls 22. Drive loops 28 are preferably embodied as toothed chains of the link type connected by pins and are received by associated toothed wheels 30 at opposite ends of the furnace 12 on each of its lateral sides. Driving of the toothed wheels 30 slidably moves an upper reach of each drive loop 28 over an associated support surface 32 located outside of the furnace heating chamber at the adjacent lateral side of the furnace. Roll positioners 34 project upwardly from the support surfaces 32 and capture central pins of the roll ends such that movement of the drive loops 28 frictionally drives the roll ends to provide rotation thereof and consequent conveyance of glass sheets supported by the rolls within the heating chamber 18. The ends of each roll 22 project outwardly from the heating chamber 18 through upper and lower heat seals 36 of the housing 16 for the support and frictional driving by the drive loops 28.

Furnace housing 16 illustrated in FIG. 2 is of a two-part type including a fixed lower section 38 and a vertically movable upper section 40. A framework 42 of the lower section 38 has legs resting on the floor 44 and supports a corrugated metal liner 46 which in turn supports ceramic blocks 48 that insulate the lower housing section. Electric resistance elements 50 secured by T-shaped ceramic retainers 52 are supplied electrical power to provide heating of the chamber 18 from below the roller conveyor 20 which is located between the lower and upper housing sections 38 and 40. Above the roller conveyor 20, the upper housing section 40 is supported on an unshown suspension framework by counterbalances 54 in the manner disclosed by U.S. Pat. No. 3,947,242. Upper housing section 40 has a generally semicircular shape and includes an outer metal skin 56 supported on a generally semicircular metal frame 58. Outer and inner ceramic blocks 62 and 64 of generally semicircular shapes are located within the frame 58 and provide insulation to the upper housing section 40. Electric resistance elements 66 are secured by T-shaped ceramic retainers 68 and are supplied electrical power to provide heating of the chamber 18 above the roller conveyor 20. The semicircular shape of the upper housing section 40 provides much more uniform radiant heating of the conveyed glass sheets than is possible with a downwardly opening U shape with right angle corners.

As seen in FIGS. 1, 2, and 3, furnace 12 includes upper and lower arrays 70 and 72 of the gas jet pumps 24 just upstream from the processing station 14. Each array 70 and 72 includes a plurality of the gas jet pumps 24 spaced transversely to the direction of conveyance. The upper array 70 of gas jet pumps 24 is located above the roller conveyor 20 to provide forced convection heating of the top surfaces of conveyed glass sheets. The lower array 72 of gas jet pumps 24 is located below the roller conveyor 20 to provide forced convection heating of the bottom surfaces of conveyed glass sheets. Forced convection heating provided by the upper array 70 and/or the lower array 72 is utilized to provide a uniform temperature of the top and bottom surfaces of each glass sheet and to maintain the planarity of the conveyed glass sheets in preparation for processing.

Upper and lower conduit supports 74 and 76 shown in FIGS. 2 and 3 respectively mount the upper and lower arrays 70 and 72 of gas jet pumps above and below the roller conveyor 20. Upper conduit support 74 includes a conduit 78 that projects downwardly through a suitable hole in the upper housing section 40 and through an adjuster 80 which includes a suitable collar fixed to the upper housing section and also includes an associated lock screw such that the upper array of gas jet pumps can be adjusted vertically to the required elevation with respect to the roller conveyor 20. An upper end of the conduit 78 is connected by conduits 82 to the source 26 of compressed gas, and the lower end of conduit 78 is connected to a union 84. A vertically extending conduit 86 has an upper end connected to the union 84 and a lower end connected to a T fitting 88 from which laterally extending conduits 90 project in opposite directions. Just below the union 84, angular conduits 92 are connected to the conduit 86 and extend downwardly and outwardly in a lateral direction to conduits 94 whose inner ends are connected by unions 96 to the outer ends of the conduits 90. Conduit 86 as well as both of the conduits 92 supply compressed gas to the conduits 90 and 94 so as to provide a uniform distribution of the compressed gas to the upper array 70 of transversly spaced gas jet pumps 24.

The lower conduit support 76 shown in FIG. 2 includes a conduit 98 that projects upwardly through a suitable opening in the lower housing section 38 and through an adjuster 100 which includes a collar mounted on the framework 42 and also includes an associated lock screw so as to permit vertical adjustment of the lower array 72 of gas jet pumps 24 with respect to the roller conveyor 20. A lower end of the conduit 98 is connected by suitable conduits 102 to the one conduit 82 connected to the source 26 of compressed gas, and an upper end of the conduit 98 is connected to a union 104 within the heating chamber 18. A conduit 106 has a lower end connected to the union 104 and an upper end connected to a T fitting 108 that is also connected to a pair of conduits 110 projecting laterally in opposite directions from each other. Just above the union 104, angular conduits 112 are connected to the conduit 106 and extend upwardly and outwardly in opposite lateral directions therefrom for connection to conduits 114 whose inner ends are connected by unions 116 to outer ends of the conduits 110. Conduit 106 and the conduits 112 supply compressed gas to the conduits 110 and 114 so as to provide a uniform distribution of the compressed gas to the gas jet pumps 24 spaced transversely to the direction of glass sheet conveyance.

With the construction of the conduit supports 74 and 76 described above, minimal radiant heat shielding of the top and bottom surfaces of conveyed glass sheets is present as a result of the gas jet pumps 24 while still permitting the forced convection heating achieved with the gas jet pumps. As previously mentioned, the upper and lower arrays 70 and 72 of gas jet pumps can be operated separately or together under the control of suitable valving to provide top and/or bottom forced convection heating that provides a uniform glass temperature and ensures glass planarity just upstream from the processing station 14.

Different embodiments of the gas jet pumps 24 which can be utilized will now be described with reference to FIGS. 4, 5, and 6.

As seen in FIG. 4, the gas jet pump 24a is provided on a conduit C which is fed compressed gas from the external source previously described. A simple jet opening 118 of the conduit C provides a jet of primary gas flow as illustrated by arrow 120 for inducing a secondary gas flow, as illustrated by arrows 122, of gas within the heating chamber in order to provide a combined flow of heated gas. Jet opening 118 is oriented such that the combined flow of heated gas from the gas jet pump 24a is directed toward the conveyor to provide forced convection heating of conveyed glass sheets during conveyance thereof on the rolls of the conveyor with the bottom glass sheet surfaces in continuous engagement with the conveyor rolls.

Another embodiment of the gas jet pump is illustrated in FIG. 5 and identified by reference numeral 24b. A connector 124 of the gas jet pump 24b includes a first threaded end 126 that is threaded into a conduit which is fed compressed gas as previously described. A second threaded end 128 of the connector 124 is threaded into a threaded hole of a generally pointed member 130 that defines a contoured surface 132 between its larger and smaller ends with a round cross-section therebetween. An axial passage 134 of the connector 124 feeds compressed gas to one or more radial passages 136 from which the gas flows radially to an annular space 138 defined by an annular groove at the large end of the pointed member 130 adjacent the open end of the threaded hole therein which receives the threaded end 128 of the connector. A restricted opening 140 of an annular shape is defined by an axial shoulder of the connector 124 and an axial surface at the large end of the member 130 so as to feed the compressed gas outwardly along the contoured surface 132 about its complete circumference. The tendency of gas flowing along a surface to continue flowing therealong despite contours thereof deviating from a straight line provides a primary gas flow as indicated by arrows 142 along the contoured surface 132. This primary gas flow induces a secondary gas flow as illustrated by arrows 144, of gas within the heating chamber in order to provide a combined flow of heated gas. The orientation of the gas jet pump 24b is such that the combined flow of heated gas therefrom is directed toward the conveyor to provide forced convection heating of conveyed glass sheets during conveyance thereof on the rolls of the conveyor with the bottom glass sheet surfaces in continuous engagement with the conveyor rolls. Pointed member 130 is adjustably threaded on the connector 124 to adjust the size of the restricted opening 140 and thereby control the extent of primary gas flow that is fed through the pump to induce the secondary gas flow. A lock screw 146 received by the pointed end of the member 130 is threaded into engagement with the axial surface of the threaded end 128 on the connector to secure the pointed member in any adjusted position.

Gas jet pump 24c illustrated in FIG. 6 is generally similar to the gas jet pump 24b shown in FIG. 5 and, as such, like reference numerals are applied to like components thereof and have the same structure and operation except as will be noted. Gas jet pump 24c includes an annular radial flange 148 that projects outwardly from the connector 124 at the large end of the pointed member 130. An annular guide 150 projects radially from the flange 148 in order to initially guide the primary gas flow illustrated by arrows 142 along the contoured surface 132 of the pointed member. The primary gas flow then induces the secondary gas flow within the heating chamber as illustrated by arrows 144 in the same manner previously described.

A much greater extent of secondary gas flow in relationship to the extent of primary gas flow can be achieved with the type of gas jet pumps illustrated in FIGS. 5 and 6 than can be achieved with a simple jet opening type of pump as illustrated in FIG. 4. Secondary gas mass flow rates on the order of 20 times the mass flow rate of the primary gas can be achieved with the type of gas jet pumps shown in FIGS. 5 and 6. Thus, when this type of jet pump is used within a furnace wherein the secondary gas flow is gas heated by radiant electric heating or another type of heater within the furnace, no preheating of the compressed gas that supplies the primary gas is necessary other than that which takes place during flow through the conduits that feed the pumps.

Figure 7:
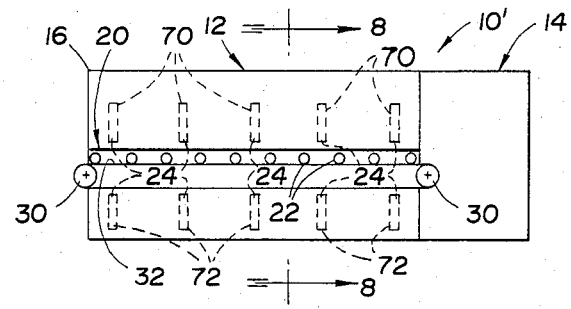
FIG. 7 is a schematic side elevation view of another glass sheet processing system that includes a roller conveyor furnace incorporating gas jet pump heating in accordance with the present invention.
Figure 8:
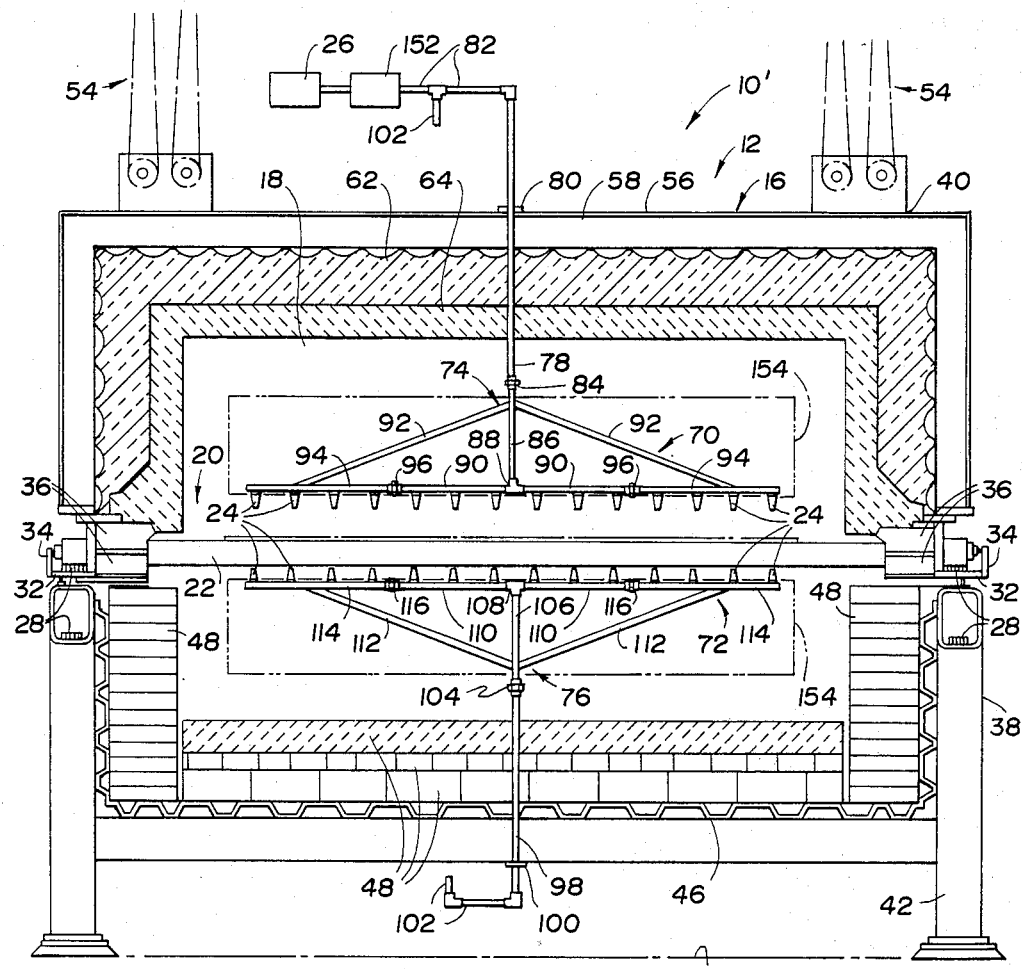
FIG. 8 is a cross-sectional view taken generally along line 8—8 in FIG. 7 and illustrates upper and lower arrays of gas jet pumps that provide forced convection heating of glass sheets during conveyance on the roller conveyor of the furnace.

With reference to FIGS. 7 and 8, another embodiment of a glass sheet processing system is indicated generally by reference numeral 10' and is identical to the previously described embodiment except as will be noted. As such, like reference numerals are applied to like components thereof and the previous description is applicable such that no repetition thereof is necessary.

As seen in FIG. 7, the furnace 12 of system 10' includes a plurality of the gas jet pumps 24 spaced along the length of the conveyor within the heating chamber. A heater 152 (FIG. 8) of any suitable type is also provided for heating the compressed gas that is supplied by the external source 26 to the gas jet pumps 24 within the heating chamber. Housing 16 of the system 10' does not include any radiant heaters, like the previously described embodiment, or any other type of internal heater such that the heated and compressed gas supplied to the gas jet pumps 24 provides the primary source for heating the furnace. During operation, the heated gas supplied to the gas jet pumps 24 provides a primary gas flow in order to induce a secondary gas flow to provide a combined gas flow of heated gas that produces the forced convection heating. With this type of system, a certain amount of start-up time is necessary before the heated gas supplied through the gas jet pumps 24 raises the furnace ambient temperature to that required in order to provide heating of glass sheets for bending and/or tempering etc.

System 10' shown in FIGS. 7 and 8 includes upper and lower arrays 70 and 72 of the gas jet pumps 24 spaced along the length of the conveyor to provide the forced convection heating of both the top and bottom surfaces of the conveyed glass sheets as the bottom surfaces thereof are maintained in continuous engagement with the conveyor rolls 22. Upper and lower conduit supports 74 and 76 mount the gas jet pumps 24 of the upper and lower arrays such that the combined flow of heated gas therefrom is directed toward the plane of conveyance. Schematically indicated insulation 154 of any suitable form surrounds each gas jet pump 24 to prevent radiant heating of the conveyed glass sheets by the conduit supports 74 and 76 which are necessarily heated to a relatively high temperature by the heated gas flow therethrough to the gas jet pumps. Also, it will be noted that the upper housing section 40 of this furnace 12 has a downwardly opening U-shape with square corners rather than a semicircular shape as with the previously described embodiment. This square cornered embodiment of the upper housing section 40 defines a heating chamber 18 of a smaller volume which allows the furnace ambient to be maintained at the required temperature with a smaller flow rate of heated gas supplied to the gas jet pumps 24.

Any one of the gas jet pump embodiments 24a, 24b, or 24c shown in FIGS. 4, 5, and 6 can be utilized with the system 10' illustrated in FIGS. 7 and 8. However, it is preferable for the gas jet pumps 24 of system 10' to include a simple jet opening like the jet pump 24a but utilizing a nipple that is mounted on the associated conduit support 74 or 76 to define the jet opening. Such jet pumps 24 project from the insulation 154 toward the conveyor a sufficient extent to allow the primary flow of heated gas supplied thereto to induce the secondary flow and thereby provide effective operation.

With both of the systems 10 and 10' described above, the mass flow rates of heated gas from the gas jet pumps 24 must be limited to prevent the heated glass sheets from being deformed downwardly between the conveyor rolls 22 and to prevent the glass sheets from being lifted upwardly such that their bottom surfaces disengage the conveyor rolls. In this regard, it should be noted that the upper and lower arrays 70 and 72 of the gas jet pumps 24 preferably oppose each other in order to counteract the forces applied to the top and bottom surfaces of the glass sheets and thereby permit a greater amount of forced convection heating than would otherwise be possible.

While the best modes for carrying out the invention have been described in detail, those familiar with the art to which this invention relates will recognize various alternative designs and embodiments for practicing the invention as defined by the following claims.

What is claimed is:

1. A glass sheet heating furnace comprising: a housing defining a heating chamber; a roller conveyor including horizontally extending rolls for conveying glass sheets horizontally through the heating chamber for heating thereof; at least one gas jet pump located within the heating chamber and having an external surface including a distal end; a source of pressurized gas communicated with the gas jet pump; said gas jet pump having means for supplying the pressurized gas from the source directly to the external surface for flow toward the distal end thereof to supply a primary gas flow thereto in order to induce a secondary gas flow and provide a combined flow of heated gas; and said gas jet pump being oriented such that the combined flow of heated gas therefrom is directed from the external surface thereof toward the conveyor to provide forced convection heating of conveyed glass sheets during conveyance thereof on the rolls of the conveyor with the bottom glass sheet surfaces in continuous engagement with the conveyor rolls.

2. A furnace as in claim 1 wherein the source of pressurized gas that feeds the gas jet pump is located externally of the heating chamber.

3. A furnace as in claim 1 wherein the gas jet pump comprises: a restricted opening that is fed compressed gas from said source, and the external surface along which the primary gas flow is fed from said opening having a pointed shape.

4. A furnace as in claim 3 wherein the gas jet pump further includes a deflector that initially guides the primary gas flow from the restricted opening along the contoured surface.

5. A furnace as in claim 1, 2, 3 or 4 which includes an array of the gas jet pumps spaced from each other transversely to the direction of conveyance.

6. A furnace as in claim 5 wherein the array of gas jet pumps is located above the roller conveyor to provide forced convection heating of the top surfaces of conveyed glass sheets.

7. A furnace as in claim 5 wherein the array of gas jet pumps is located below the roller conveyor to provide forced convection heating of the bottom surfaces of conveyed glass sheets.

8. A furnace as in claim 1, 2, 3 or 4 which includes upper and lower arrays of the gas jet pumps, the gas jet pumps of each array being spaced from each other transversely to the direction of conveyance, and the upper and lower arrays of gas jet pumps being respectively located above and below the conveyor rolls to provide forced convection heating of both the top and bottom surfaces of conveyed glass sheets.

9. A furnace as in claim 8 further including upper and lower conduit supports that respectively mount the upper and lower arrays of gas jet pumps above and below the conveyor.

10. A glass sheet heating furnace comprising: a housing defining a heating chamber; electric resistance elements supported by the housing within the heating chamber to provide heating thereof; a roller conveyor including horizontally extending rolls for conveying glass sheets horizontally through the heating chamber for heating thereof; an array of gas jet pumps spaced from each other transversely to the direction of conveyance; each gas jet pump including an external contoured surface having a distal end; a source of compressed gas located externally of the heating chamber; a conduit support that mounts the array of gas jet pumps within the heating chamber and provides communication thereof with the compressed gas source; each gas jet pump having means for supplying the pressurized gas from the conduit support directly to the external surface thereof for flow toward the distal end thereof to supply a primary gas flow to each pump in order to induce a secondary gas flow and provide a combined gas flow of heated gas; and said gas jet pumps being oriented such that the combined flow of heated gas therefrom is directed toward the conveyor to provide forced convection heating of conveyed glass sheets during conveyance thereof on the rolls of the conveyor with the bottom glass sheet surfaces in continuous engagement with the conveyor rolls.

11. A furnace as in claim 10 further including an adjuster for vertically adjusting the conduit support and the array of gas jet pumps mounted on the conduit support.

12. A glass sheet heating furnace comprising: a housing defining a heating chamber; electric resistance elements supported by the housing within the heating chamber to provide heating thereof; a roller conveyor including horizontally extending rolls for conveying glass sheets horizontally through the heating chamber for heating thereof; an array of gas jet pumps located above the conveyor and spaced from each other transversely to the direction of conveyance; each gas jet pump including an external contoured surface having a distal end; a source of compressed gas located externally of the heating chamber; a conduit support that mounts the array of gas jet pumps within the heating chamber and provides communication thereof with the compressed gas source; each gas jet pump having means for supplying the pressurized gas from the conduit support directly to the external surface thereof for flow toward the distal end thereof to supply a primary gas flow to each pump in order to induce a secondary gas flow and provide a combined gas flow of heated gas; and said gas jet pumps being oriented such that the combined flow of heated gas therefrom is directed downwardly toward the conveyor to provide forced convection heating to the top surfaces of conveyed glass sheets during conveyance thereof on the rolls of the conveyor with the bottom glass sheet surfaces in continuous engagement with the conveyor rolls.

13. A glass sheet heating furnace comprising: a housing defining a heating chamber; electric resistance elements supported by the housing within the heating chamber to provide heating thereof; a roller conveyor including horizontally extending rolls for conveying glass sheets horizontally through the heating chamber for heating thereof; an array of gas jet pumps located below the conveyor and spaced from each other transversely to the direction of conveyance; each gas jet pump including an external contoured surface having a distal end; a source of compressed gas located externally of the heating chamber; a conduit support that mounts the array of gas jet pumps within the heating chamber and provides communication thereof with the compressed gas source; each gas jet pump having means for supplying the pressurized gas from the conduit support directly to the external surface thereof for flow toward the distal end thereof to supply a primary gas flow to each pump in order to induce a secondary gas flow and provide a combined gas flow of heated gas; and said gas jet pumps being oriented such that the combined flow of heated gas therefrom is directed upwardly between the rolls of the conveyor to provide forced convection heating of the bottom surfaces of conveyed glass sheets during conveyance thereof on the rolls of the conveyor with the bottom glass sheet surfaces in continuous engagement with the conveyor rolls.

14. A glass sheet heating furnace comprising: a housing defining a heating chamber; electric resistance elements supported by the housing within the heating chamber to provide heating thereof; a roller conveyor including horizontally extending rolls for conveying glass sheets horizontally through the heating chamber for heating thereof; upper and lower arrays of gas jet pumps respectively positioned within the heating chamber above and below the roller conveyor; each array having gas jet pumps spaced from each other transversely to the direction of conveyance; each gas jet pump including an external contoured surface having a distal end; a source of compressed gas located externally of the heating chamber; upper and lower conduit supports that respectively mount the gas jet pumps of the upper and lower arrays and provide communication thereof with the compressed gas source; each gas jet pump having means for supplying the pressurized gas from the conduit support directly to the external surface thereof for flow toward the distal end thereof to supply a primary gas flow to each pump in order to induce a secondary gas flow and provide a combined gas flow of heated gas; said gas jet pumps of the upper array being oriented such that the combined flow of heated gas therefrom is directed downwardly toward the top surfaces of conveyed glass sheets to provide forced convection heating thereof during conveyance of the glass sheets with the bottom surfaces thereof in continuous engagement with the conveyor rolls; and the gas jet pumps of the lower array being oriented such that the combined flow of heated gas therefrom is directly upwardly between the conveyor rolls toward the bottom surfaces of conveyed glass sheets to provide forced convection heating thereof during conveyance of the glass sheet with the bottom surfaces thereof in continuous engagement with the conveyor rolls.

* * * * *